H. E. GRABAU.
VEHICLE TIRE.
APPLICATION FILED MAY 18, 1916.

1,199,264.

Patented Sept. 26, 1916.
2 SHEETS—SHEET 1.

Witnesses
G. T. Baker.
H. P. Jennings.

Inventor
H. E. Grabau
by Foster Freeman Watson & Coit
Attorney

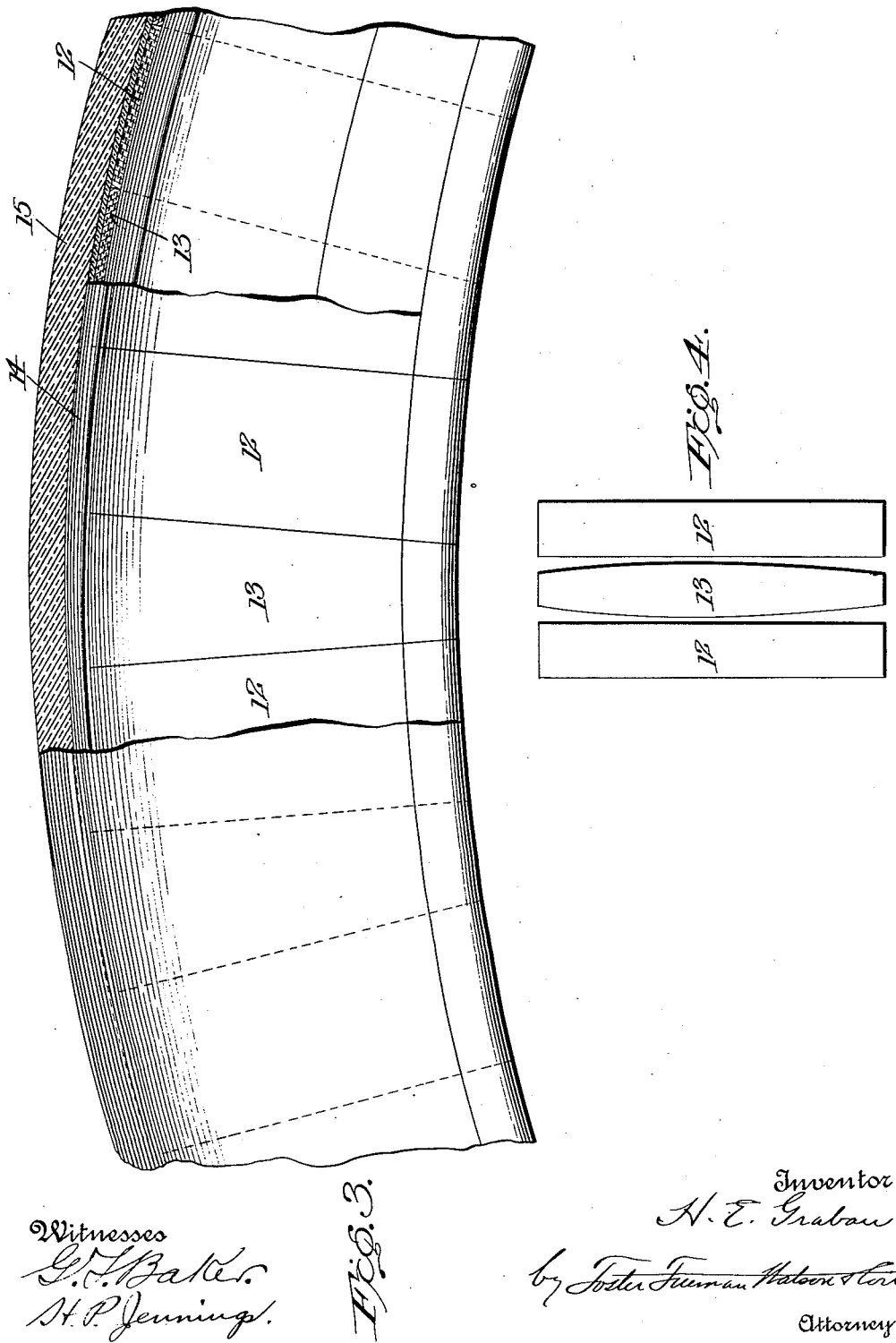

UNITED STATES PATENT OFFICE.

HANS E. GRABAU, OF LONG ISLAND CITY, NEW YORK.

VEHICLE-TIRE.

1,199,264.  Specification of Letters Patent.  Patented Sept. 26, 1916.

Application filed May 18, 1916. Serial No. 98,339.

*To all whom it may concern:*

Be it known that I, HANS E. GRABAU, a citizen of the United States, residing at Long Island City, Queens county, State of New York, have invented certain new and useful Improvements in Vehicle-Tires, of which the following is a specification.

This invention relates to a vehicle tire and more particularly to pneumatic tires.

The objects of the invention are to provide a tire which shall have a strong construction and which can be manufactured at a less cost than the tires now used.

These and other features of the invention will be described in connection with the drawings and pointed out in the appended claims.

Figure 1:
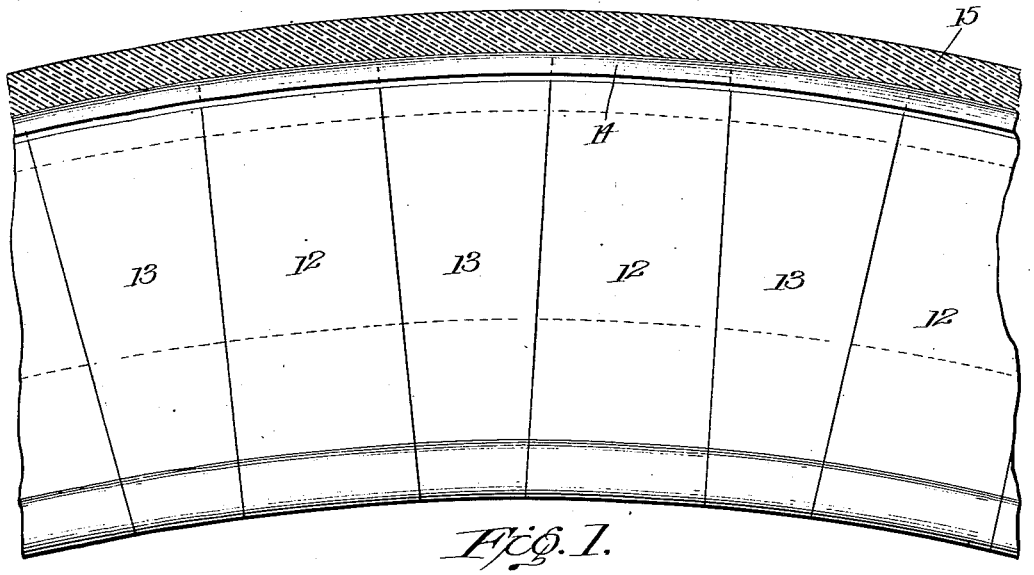
Figure 2:
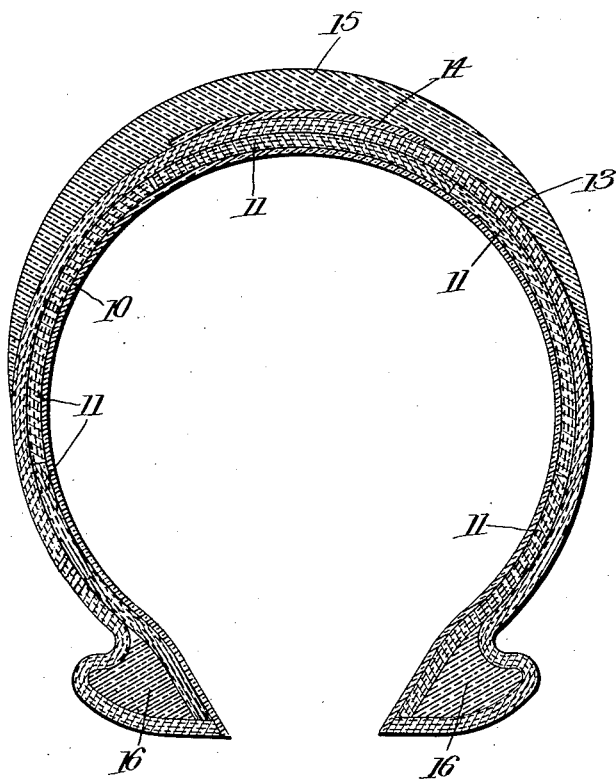

In the drawing, in which like reference characters indicate like parts, Figure 1 is a side elevation of a portion of a tire the tread being shown in section; Fig. 2 is a transverse sectional view through a tire; Fig. 3 is a side view similar to Fig. 1, but with parts broken away to show the interior construction; Fig. 4 is a view showing a development of the transverse strips of fabric used in the tire.

As commonly made pneumatic tires consist of a plurality of layers of fabric each layer comprising a single ply of rubber coated and rubber impregnated material, which can be easily manufactured and constructed. As a ply of this rubberized fabric is formed into position on the tire, it is obvious that the portions adjacent the beads must be considerably compressed in a circumferential direction, because the circumferential length at the tread is greater than near the beads. Hence the fabric adjacent the beads has very little resistance to any force tending to produce a tension in the fabric. One of the principal objects of the invention is to produce a tire which does not have this weakness.

As clearly shown in the drawings, the carcass of the tire comprises a series of transversely extending strips of fabric and a series of circumferentially extending strips. The interior surface of the tire is formed by a layer of the usual rubber coated single ply fabric 10. Said layer is covered by a series of circumferentially extending strips 11 of belting fabric.

The term belting fabric is intended to describe a fabric which consists of two or more plies which are interwoven to produce a strong and substantially non-stretchable fabric. As used in this invention it is in the form of narrow strips, the warp threads extending lengthwise of the same.

Around the circumferential strips a series of transversely extending strips of belting fabric 12, 13 are wrapped. The strips 12 are substantially rectangular in outline, while the strips 13 are cut to fit between the rectangular strips 12. It is obvious that the strips might have other outlines, the object being to have the length of the strips extend transversely around the tire. As shown, a strip 11 is on the inside of each bead 16 and the strips 12, 13 on the outside. A breaker strip 14 of rubberized single ply fabric may be positioned centrally of the transverse section of the carcass, and the usual tread 15 of rubber located outside, as illustrated in Fig. 2. All of the above described layers are vulcanized together and the rubber tread to the outside layer. For this purpose the belting fabric is made with a coating of rubber which penetrates into the fibers of the fabric more or less, as in the ordinary single ply rubberized fabric. It is therefore quite obvious that the structure of this invention is very economical of rubber. For instance, if it is desired to build a carcass having four plies, the old way would require four layers of rubberized fabric, each of one ply and having a coating of rubber. According to this invention, however, two layers of fabric, each layer having two plies might be used, and, of course, rubber coating would be required only between the layers desired to be vulcanized, resulting in a very great saving in rubber, and yet producing a structure as strong if not stronger than the old form.

An inspection of the drawings in view of the foregoing description will make it apparent that the arrangement of strips of fabric extending circumferentially of the tire reinforced by the transverse strips overcomes the weakness in the usual tire adjacent the beads. Furthermore by the use of strips of multiply or belting fabric, a considerable saving in rubber is effected. While a tire having five circumferentially extending strips, (two on one side of the tire, two on the other and an intermediate or central strip,) is shown, it is obvious the number of strips may be varied; the object being to use such a number of strips that the difference in tension between the threads at one edge and the threads at the other edge of a strip will not be excessive. Furthermore it is obvious that the strips need not all be of the same width.

While a rubber tread vulcanized to the carcass is shown, it is obvious that a removable or any other desired tread might be used.

Having thus described the invention, what is claimed and desired to be secured by Letters Patent is:

1. A vehicle tire comprising a plurality of layers of fabric, one layer consisting of a plurality of strips of belting fabric arranged side by side and extending circumferentially of the tire and vulcanized to an adjacent layer.

2. A vehicle tire comprising a plurality of layers of fabric, one layer consisting of strips of belting fabric extending circumferentially of the tire, and another layer consisting of strips of belting fabric arranged transversely of the tire, the contacting layers being vulcanized together.

3. A vehicle tire comprising a plurality of layers of fabric, one layer consisting of strips of belting fabric extending circumferentially of the tire and vulcanized to an adjacent layer.

4. A vehicle tire comprising a plurality of layers of fabric, one layer including strips of fabric extending circumferentially of the tire and vulcanized to the adjacent layer each strip forming a circular ring.

5. A vehicle tire comprising a plurality of layers of fabric, one layer consisting of a plurality of strips of fabric on one side of the tire and a plurality of strips on the other side, said strips extending circumferentially of the tire and vulcanized to an adjacent layer.

6. A vehicle tire comprising a plurality of layers of fabric, one layer consisting of a plurality of strips of fabric on one side of the tire, a plurality of strips of fabric on the other side, said strips vulcanized to an adjacent layer, and each strip extending circumferentially of the tire and having its warp threads extending lengthwise of the strip.

7. A vehicle tire comprising a plurality of layers of fabric, one layer consisting of a plurality of strips of fabric extending circumferentially of the tire and having its warp threads extending lengthwise of the strip, and another layer consisting of strips of fabric arranged transversely of the tire substantially at right angles to the longitudinal strips and extending from bead to bead.

8. A vehicle tire comprising a plurality of layers of fabric, one layer consisting of a plurality of strips of fabric on one side of the tire, a plurality of strips of fabric on the other side, and an intermediate or central strip, corresponding strips on the two sides being of the same width, and each strip extending circumferentially of the tire.

In testimony whereof I affix my signature.

HANS E. GRABAU.